United States Patent
Wu et al.

(10) Patent No.: US 11,882,277 B2
(45) Date of Patent: Jan. 23, 2024

(54) VIDEO ENCODING METHOD USING MULTIPLE IN-LOOP FILTERS IN LOW LATENCY VIDEO ENCODING AND ASSOCIATED VIDEO ENCODING APPARATUS

(71) Applicant: MEDIATEK INC., Hsin-Chu (TW)

(72) Inventors: Tung-Hsing Wu, Hsinchu (TW);
Shih-Yu Chen, Hsinchu (TW);
Jer-Ming Chang, Hsinchu (TW);
Chih-Hao Chang, Hsinchu (TW);
Han-Liang Chou, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 113 days.

(21) Appl. No.: 17/725,574

(22) Filed: Apr. 21, 2022

(65) Prior Publication Data
US 2022/0360775 A1   Nov. 10, 2022

Related U.S. Application Data

(60) Provisional application No. 63/184,327, filed on May 5, 2021.

(51) Int. Cl.
*H04N 19/117* (2014.01)
*H04N 19/176* (2014.01)
*H04N 19/182* (2014.01)
*H04N 19/80* (2014.01)

(52) U.S. Cl.
CPC ......... *H04N 19/117* (2014.11); *H04N 19/176* (2014.11); *H04N 19/182* (2014.11); *H04N 19/80* (2014.11)

(58) Field of Classification Search
CPC .. H04N 19/117; H04N 19/176; H04N 19/182; H04N 19/80
See application file for complete search history.

(56) References Cited

U.S. PATENT DOCUMENTS

| | | | |
|---|---|---|---|
| 2008/0043853 A1* | 2/2008 | Kawa | H04N 19/423 382/268 |
| 2013/0322548 A1* | 12/2013 | Narroschke | H04N 19/117 375/240.24 |
| 2019/0182495 A1 | 6/2019 | Bruns | |
| 2020/0213624 A1 | 7/2020 | Chao | |

* cited by examiner

*Primary Examiner* — Jae N Noh
(74) *Attorney, Agent, or Firm* — Winston Hsu

(57) ABSTRACT

A video encoding method includes: during a first period, performing an encoding process upon a first block group of a current frame to generate a first block group bitstream; and during a second period, transmitting a second block group bitstream derived from encoding a second block group of the current frame, wherein the second period overlaps the first period. The encoding process includes: during a first time segment of the first period, performing a first in-loop filtering process upon a first group of pixels; and during a second time segment of the first period, performing a second in-loop filtering process upon a second group of pixels, wherein the second time segment overlaps the first time segment, and a non-zero pixel distance exists between a first edge pixel of the first group of pixels and a second edge pixel of the second group of pixels in a filter direction.

20 Claims, 5 Drawing Sheets

VIDEO ENCODING METHOD USING MULTIPLE IN-LOOP FILTERS IN LOW LATENCY VIDEO ENCODING AND ASSOCIATED VIDEO ENCODING APPARATUS

CROSS REFERENCE TO RELATED APPLICATIONS

This application claims the benefit of U.S. Provisional Application No. 63/184,327, filed on May 5, 2021. The content of the application is incorporated herein by reference.

BACKGROUND

The present invention relates to video processing, and more particularly, to a video encoding method using multiple in-loop filters in low latency video encoding and an associated video encoding apparatus.

The conventional video coding standards generally adopt a block based coding technique to exploit spatial and temporal redundancy. For example, the basic approach is to divide the whole source frame into a plurality of blocks, perform intra/inter prediction on each block, transform residues of each block, and perform quantization and entropy encoding. Besides, a reconstructed frame is generated in a coding loop to provide reference pixel data used for coding following blocks. For certain video coding standards, in-loop filter(s) may be used for enhancing the image quality of the reconstructed frame. A typical video encoder starts to transmit an encoded bitstream of a frame after encoding of the whole frame is completed. Furthermore, regarding a typical video encoder using multiple in-loop filters, one of the in-loop filters starts to apply an in-loop filtering process to a reconstructed frame after another of the in-loop filters finishes an in-loop filtering process of the reconstructed frame. However, such a video encoder design fails to meet the requirements of a low latency application such as a gaming application.

Thus, there is a need for an innovative video encoder capable of performing low latency video encoding under a condition that multiple in-loop filters are used.

SUMMARY

One of the objectives of the claimed invention is to provide a video encoding method using multiple in-loop filters in low latency video encoding and an associated video encoding apparatus.

According to a first aspect of the present invention, an exemplary video encoding method is disclosed. The exemplary video encoding method includes: during a first period, performing an encoding process upon a first block group of a current frame to generate a first block group bitstream, wherein the current frame comprises a plurality of block groups, each of the plurality of block groups comprises a plurality of blocks, each of the plurality of blocks comprises a plurality of pixels, and the plurality of block groups comprise the first block group and a second block group; and during a second period, transmitting a second block group bitstream derived from encoding the second block group of the current frame, wherein the second period overlaps the first period. The encoding process includes: during a first time segment of the first period, performing a first in-loop filtering process upon a first group of pixels; and during a second time segment of the first period, performing a second in-loop filtering process upon a second group of pixels, wherein the second time segment overlaps the first time segment, and a non-zero pixel distance exists between a first edge pixel of the first group of pixels in a filter direction and a second edge pixel of the second group of pixels in the filter direction.

According to a second aspect of the present invention, an exemplary video encoding apparatus is disclosed. The exemplary video encoding apparatus includes a video encoding circuit. The video encoding circuit is arranged to encode a first block group of a current frame to generate a first block group bitstream during a first period, and transmit a second block group bitstream derived from encoding a second block group of the current frame during a second period, wherein the second period overlaps the first period, the current frame comprises a plurality of block groups, each of the plurality of block groups comprises a plurality of blocks, each of the plurality of blocks comprises a plurality of pixels, and the plurality of block groups comprise the first block group and the second block group. The video encoding circuit comprises a first in-loop filter and a second in-loop filter. The first in-loop filter is arranged to perform a first in-loop filtering process upon a first group of pixels during a first time segment of the first period. The second in-loop filter is arranged to perform a second in-loop filtering process upon a second group of pixels during a second time segment of the first period, wherein the second time segment overlaps the first time segment, and a non-zero pixel distance exists between a first edge pixel of the first group of pixels in a filter direction and a second edge pixel of the second group of pixels in the filter direction.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
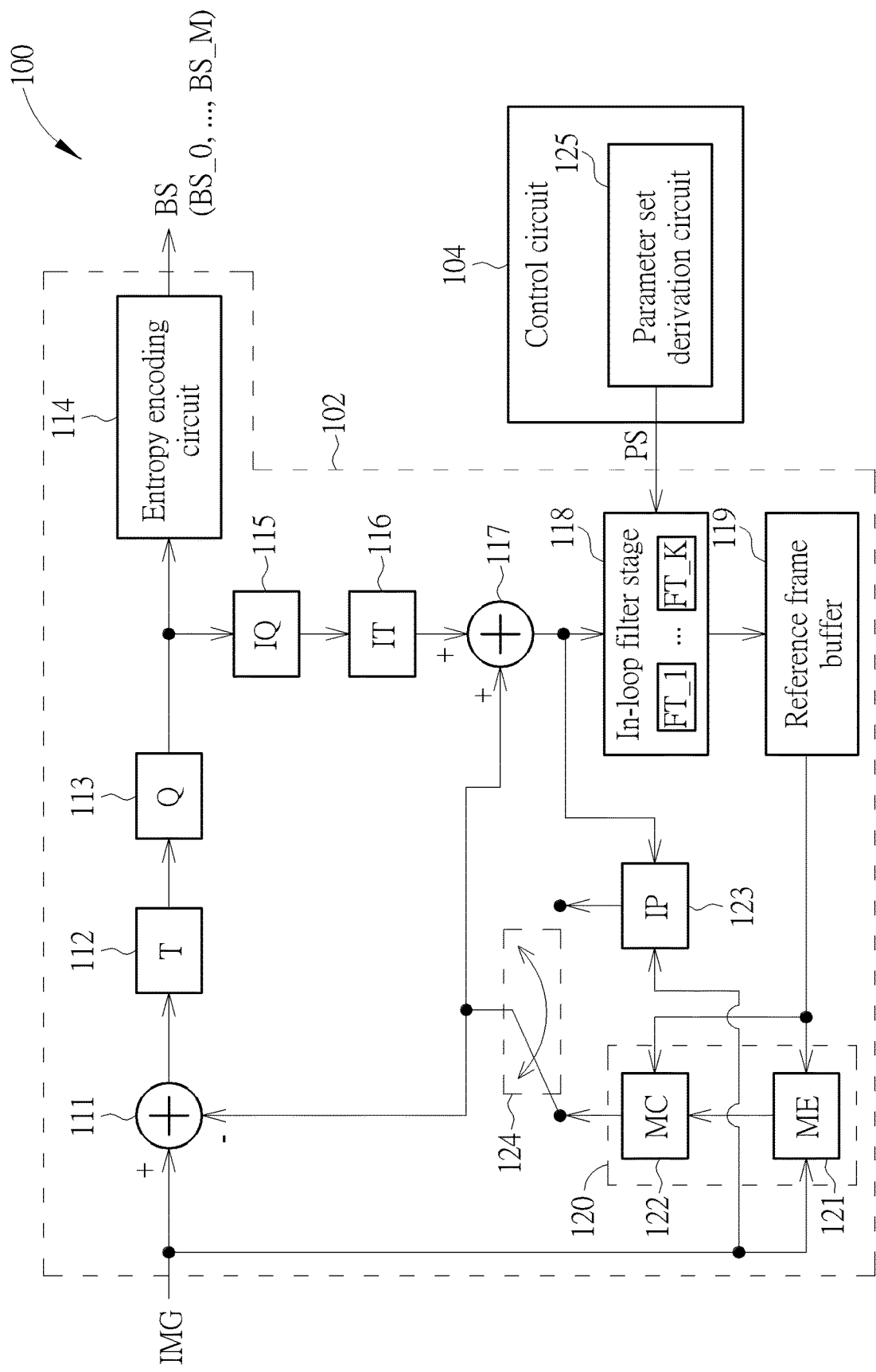
FIG. 1 is a diagram illustrating a video encoding apparatus according to an embodiment of the present invention.

FIG. 1 is a diagram illustrating a video encoding apparatus according to an embodiment of the present invention. The video encoding apparatus 100 is a hardware circuit used to compress raw video data to generate compressed video data. As shown in FIG. 1, the video encoding apparatus includes a video encoding circuit 102 and a control circuit 104. It should be noted that the video encoder architecture shown in FIG. 1 is for illustrative purposes only, and is not meant to be a limitation of the present invention. For example, the architecture of the video encoding circuit 102 may vary depending upon the coding standard. That is, additional coding tools, pre-processing, and/or post-processing may be added to the video encoding circuit 102. The video encoding circuit 102 encodes one frame IMG to generate one bitstream BS for transmission. Regarding the low latency video encoding, the bitstream BS generated from encoding the frame IMG may include a plurality of block group bitstreams BS_0-BS_M each derived from encoding a block group in the frame IMG, where the value of M depends on the number of block groups in the frame IMG. As shown in FIG. 1, the video encoding circuit 102 includes a residual calculation circuit 111, a transform circuit (denoted by "T") 112, a quantization circuit (denoted by "Q") 113, an entropy encoding circuit (e.g., a variable length encoder) 114, an inverse quantization circuit (denoted by "IQ") 115, an inverse transform circuit (denoted by "IT") 116, a reconstruction circuit 117, an in-loop filter stage 118, a reference frame buffer 119, an inter prediction circuit 120 (which includes a motion estimation circuit (denoted by "ME") 121 and a motion compensation circuit (denoted by "MC") 122), an intra prediction circuit (denoted by "IP") 123, and an intra/inter mode selection switch 124. In this embodiment, the in-loop filter stage 118 includes a plurality of in-loop filters FT_1-FT_K, where K is a positive integer not smaller than 2 (i.e. K≥2). For example, the in-loop filters FT_1-FT_K may include a de-blocking filter, a sample adaptive offset (SAO) filter, and/or an adaptive loop filter (ALF).

The control circuit 104 is arranged to manage the operations of the video encoding circuit 102. For example, the control circuit 104 includes a parameter set derivation circuit 125 used to determine at least one parameter set PS for one of the in-loop filters FT_1-FT_K. For example, one of the in-loop filters FT_1-FT_K is an ALF, and the parameter set derivation circuit 125 generates parameter set(s) PS for the ALF. However, this is for illustrative purposes only, and is not meant to be a limitation of the present invention.

Figure 2:
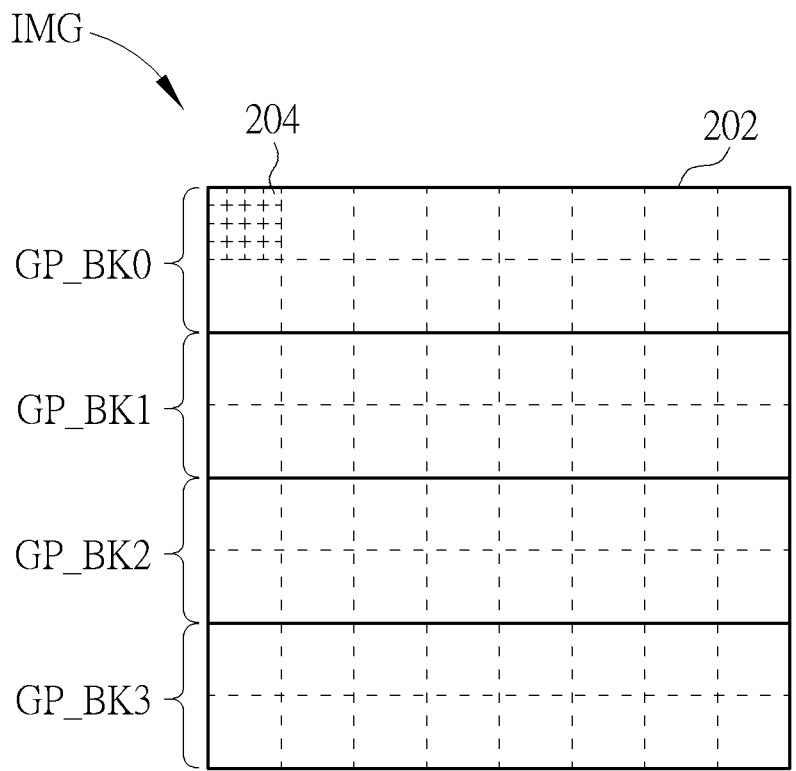
FIG. 2 is a diagram illustrating block groups obtained by partitioning a frame according to an embodiment of the present invention.
Figure 3:
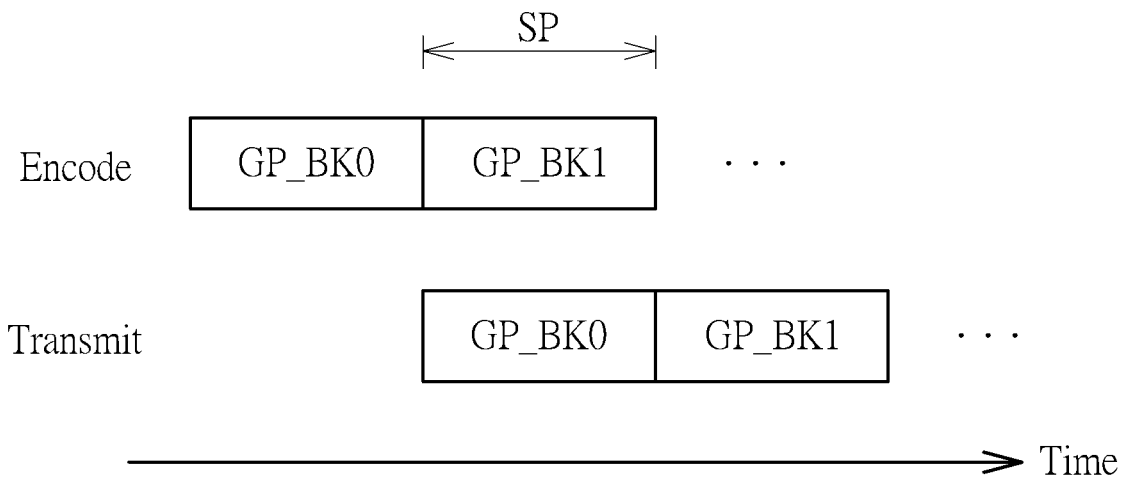
FIG. 3 is a timing diagram illustrating encoding and transmitting of block groups according to an embodiment of the present invention.

In this embodiment, the video encoding apparatus 100 supports low latency video encoding. Hence, transmission of the bitstream BS is started before encoding of the whole frame IMG is completed. Please refer to FIG. 2 in conjunction with FIG. 3. FIG. 2 is a diagram illustrating block groups obtained by partitioning the frame IMG according to an embodiment of the present invention. FIG. 3 is a timing diagram illustrating encoding and transmitting of block groups according to an embodiment of the present invention. The frame IMG may be partitioned into a plurality of block groups such as four block groups GP_BK0, GP_BK1, GP_BK2, GP_BK3. Each of the block groups GP_BK0-GP_BK3 includes a plurality of blocks 202. Each of the blocks 202 includes a plurality of pixels 204. For example, one block group may be a slice, a tile, or a sub-picture, and one block may be a coding unit (CU) or a coding tree unit (CTU). The block groups GP_BK0-GP_BK3 may be encoded independently. In accordance with the low latency video encoding, a block group bitstream derived from encoding a block group may be transmitted after encoding of the whole block group is completed. Since transmission of a block group bitstream (which is derived from encoding one of block groups in the frame IMG) does not need to wait for an end of the encoding of the whole frame IMG, the transmission latency can be greatly reduced to meet the requirements of the low latency application. Specifically, the video encoding circuit 102 performs an encoding process upon a first block group of the current frame IMG to generate a first block group bitstream during a first period, and transmits a second block group bitstream derived from encoding a second block group of the current frame IMG during a second period, where the second period overlaps the first period. In other words, the video encoding circuit 102 may perform encoding of one block group in the frame IMG and transmission of a block group bitstream (which is derived from encoding another block group in the same frame IMG) in a parallel fashion. As shown in FIG. 3, the video encoding circuit 102 may start to encode the block group GP_BK1 after encoding of the block group GP_BK0 is completed, and may start to transmit a block group bitstream derived from encoding the block group GP_BK1 after encoding of the block group GP_BK0 is completed. Hence, during the period SP, encoding of the block group GP_BK1 and transmission of the block group bitstream of the block group GP_BK0 are performed in a parallel fashion.

The in-loop filter stage 118 includes multiple in-loop filters FT_1-FT_K. In accordance with the low latency video encoding, one of the in-loop filters FT_1-FT_K may start to apply an in-loop filtering process to reconstructed pixels of the frame IMG after another of the in-loop filters FT_1-FT_K finishes an in-loop filtering process of the reconstructed pixels of the frame IMG. For example, regarding an encoding process performed upon a block group of the frame IMG during a period, the encoding process uses a first in-loop filter selected from the in-loop filters FT_1-FT_K to perform a first in-loop filtering process upon a first group of pixels during a first time segment of the period, and uses a second in-loop filter selected from the in-loop filters FT_1-FT_K to perform a second in-loop filtering process upon a second group of pixels during a second time segment of the period, where the second time segment overlaps the first time segment. Furthermore, the first in-loop filter and the second in-loop filter are constrained to have a non-zero pixel distance existing between a first edge pixel of the first group of pixels in a filter direction and a second edge pixel of the second group of pixels in the filter direction. For example, the first edge pixel is a rightmost pixel of the first group of pixels, the second edge pixel is a rightmost pixel of the second group of pixels, and the non-zero pixel distance is greater than or equal to the largest number of horizontal filter taps of one of the first in-loop filter and the second in-loop filter. For another example, the first edge pixel is a bottommost pixel of the first group of pixels, the second edge pixel is a bottommost pixel of the second group of pixels, and the non-zero pixel distance is greater than or equal to the largest number of vertical filter taps of one of the first in-loop filter and the second in-loop filter.

Figure 4:
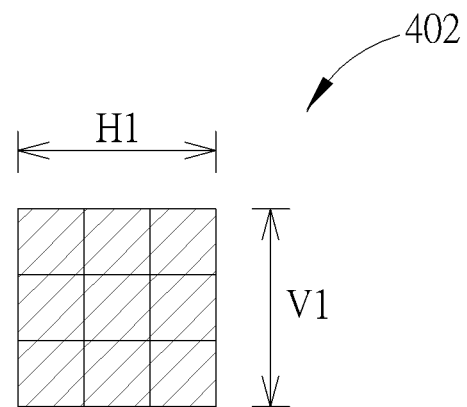
FIG. 4 is a diagram illustrating a first in-loop filter according to an embodiment of the present invention.
Figure 5:
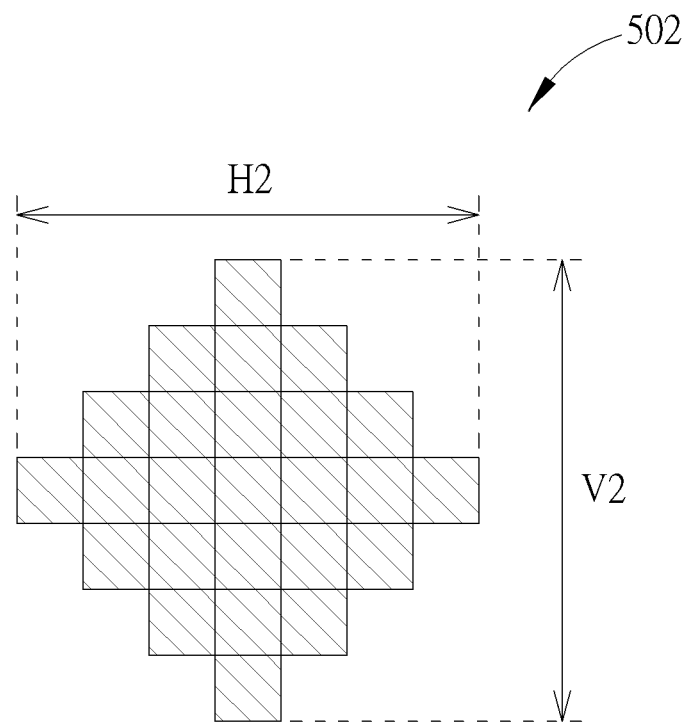
FIG. 5 is a diagram illustrating a second in-loop filter according to an embodiment of the present invention.

Please refer to FIG. 4 and FIG. 5. FIG. 4 is a diagram illustrating a first in-loop filter according to an embodiment of the present invention. FIG. 5 is a diagram illustrating a second in-loop filter according to an embodiment of the present invention. One of the in-loop filters FT_1-FT_K included in the in-loop filter stage 118 may be implemented by the first in-loop filter 402, and another of the in-loop filters FT_1-FT_K included in the in-loop filter stage 118 may be implemented by the second in-loop filter 502. The first in-loop filter 402 has a plurality of filter coefficients (e.g. 9 filter coefficients), and is arranged to apply a first in-loop filtering process to a first group of pixels (e.g. 9 pixels). The second in-loop filter 502 has a plurality of filter coefficients (e.g. 25 filter coefficients), and is arranged to apply a second in-loop filtering process to a second group of pixels (e.g. 25 pixels). Regarding the first in-loop filter 402, the largest number of horizontal filter taps is H1, and the largest number of vertical filter taps is V1, where H1=3 and V1=3. Regarding the second in-loop filter 502, the largest number of horizontal filter taps is H2, and the largest number of vertical filter taps is V2, where H2=7 and V2=7. In accordance with the low latency video encoding, the first in-loop filter 402 and the second in-loop filter 502 may process different groups of pixels belonging to the same block group in a parallel fashion. Hence, the pixel distance between the first in-loop filter 402 and the second in-loop filter 502 should be constrained to ensure that pixels (reconstructed pixels) processed by one of the first in-loop filter 402 and the second in-loop filter 502 (e.g. ALF) are already processed by the other of the first in-loop filter 402 and the second in-loop filter 502 (e.g. SAO filter) and pixels (reconstructed pixels) processed by the other of the first in-loop filter 402 and the second in-loop filter 502 (e.g. SAO filter) are not processed by one of the first in-loop filter 402 and the second in-loop filter 502 (e.g. ALF) yet.

Figure 6:
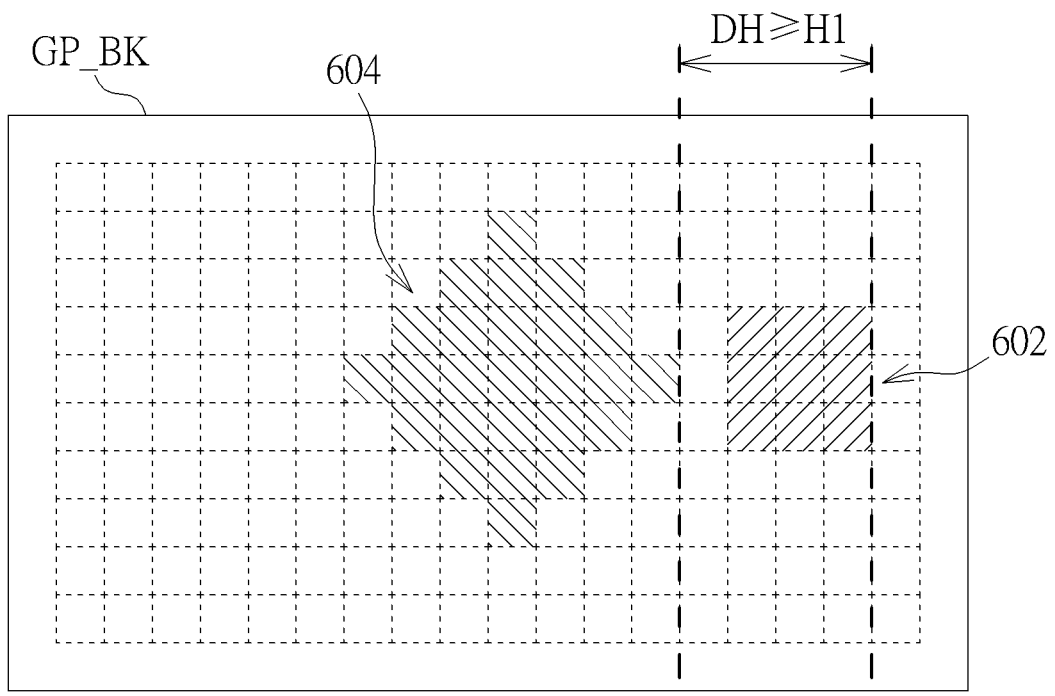
FIG. 6 is a diagram illustrating a horizontal pixel distance between a first group of pixels processed by the first in-loop filter shown in FIG. 4 and a second group of pixels processed by the second in-loop filter shown in FIG. 5 according to an embodiment of the present invention.

FIG. 6 is a diagram illustrating a horizontal pixel distance between a first group of pixels processed by the first in-loop filter 402 and a second group of pixels processed by the second in-loop filter 502 according to an embodiment of the present invention. Suppose that reconstructed pixels will undergo the first in-loop filtering process at the first in-loop filter 402 and a second in-loop filtering process at the second in-loop filter 502 in order. As shown in FIG. 6, the first group of pixels processed by the first in-loop filter 402 and the second group of pixels processed by the second in-loop filter 502 belong to the same block group GP_BK, and the first group of pixels processed by the first in-loop filter 402 is on the right side of the second group of pixels processed by the second in-loop filter 502. The horizontal pixel distance DH between the rightmost pixel of the first group of pixels 602 processed by the first in-loop filter 402 and the rightmost pixel of the second group of pixels 604 processed by the second in-loop filter 502 is constrained to be greater than or equal to the largest number of horizontal filter taps of the first in-loop filter 402.

Figure 7:
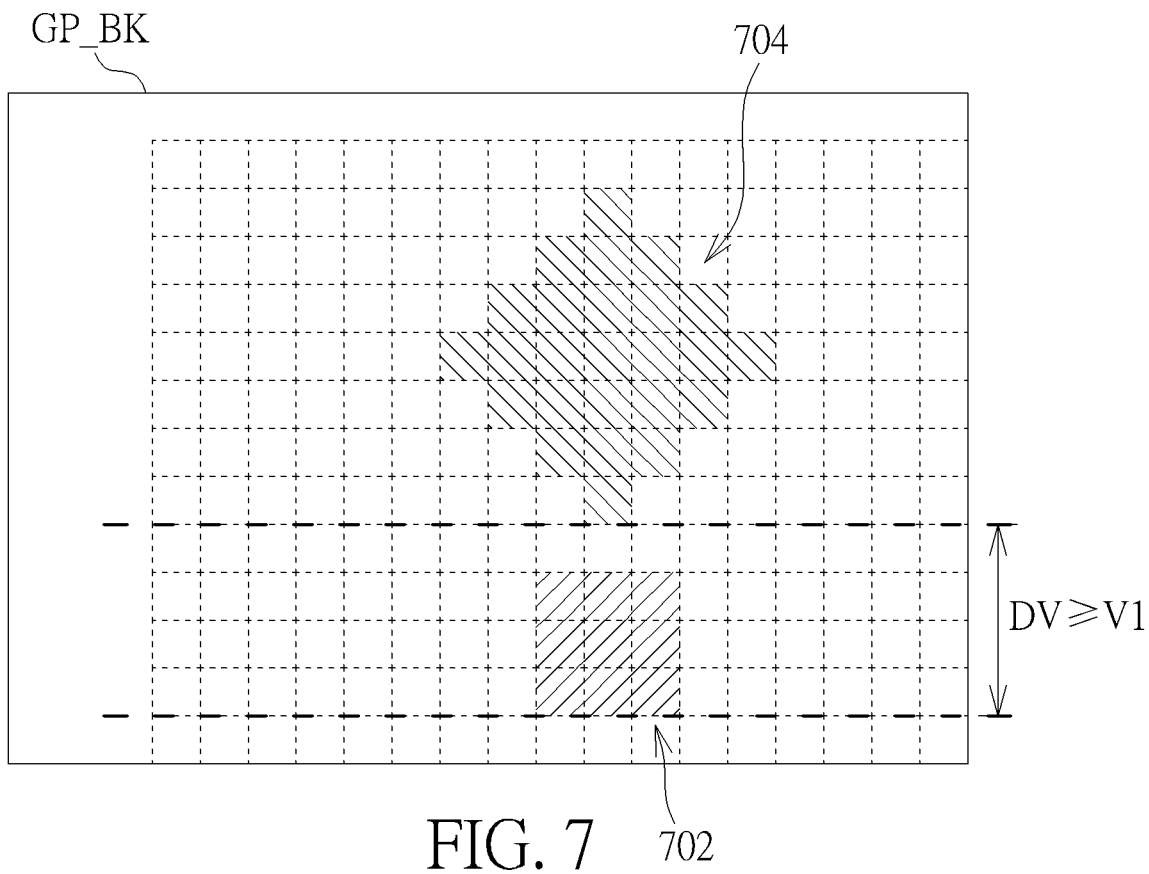
FIG. 7 is a diagram illustrating a vertical pixel distance between a first group of pixels processed by the first in-loop filter shown in FIG. 4 and a second group of pixels processed by the second in-loop filter shown in FIG. 5 according to an embodiment of the present invention.

FIG. 7 is a diagram illustrating a vertical pixel distance between a first group of pixels processed by the first in-loop filter 402 and a second group of pixels processed by the second in-loop filter 502 according to an embodiment of the present invention. Suppose that reconstructed pixels will undergo the first in-loop filtering process at the first in-loop filter 402 and a second in-loop filtering process at the second in-loop filter 502 in order. As shown in FIG. 7, the first group of pixels processed by the first in-loop filter 402 and the second group of pixels processed by the second in-loop filter 502 belong to the same block group GP_BK, and the first group of pixels processed by the first in-loop filter 402 is directly below the second group of pixels processed by the second in-loop filter 502. The vertical pixel distance DV between the bottommost pixel of the first group of pixels 702 processed by the first in-loop filter 402 and the bottommost pixel of the second group of pixels 704 processed by the second in-loop filter 502 is constrained to be greater than or equal to the largest number of vertical filter taps of the first in-loop filter 402.

As mentioned above, the parameter set derivation circuit 125 is used to determine parameter set(s) PS for one of the in-loop filters FT_1-FT_K. For example, the second filter 502 shown in FIG. 5 is an ALF, and the parameter set derivation circuit 125 generates parameter set(s) for the second filter 502. Hence, during encoding of different block groups GP_BK0-GP_BK3 in the frame IMG, filter parameters of the second filter 502 are selected from the parameter set(s) PS provided by parameter set derivation circuit 125. To meet the requirements of low latency video encoding, the filter parameter set (s) used by one of the in-loop filters FT_1-FT_K for applying an in-loop filtering process to a current frame is derived from information obtained from encoding of at least one previous frame, if the current frame is not the first frame of a video sequence; and the filter parameter set(s) used by one of the in-loop filters FT_1-FT_K for applying an in-loop filtering process to a current frame are pre-determined filter parameter set(s) generated without using information obtained from encoding of at least one previous frame, if the current frame is the first frame of the video sequence.

Figure 8:
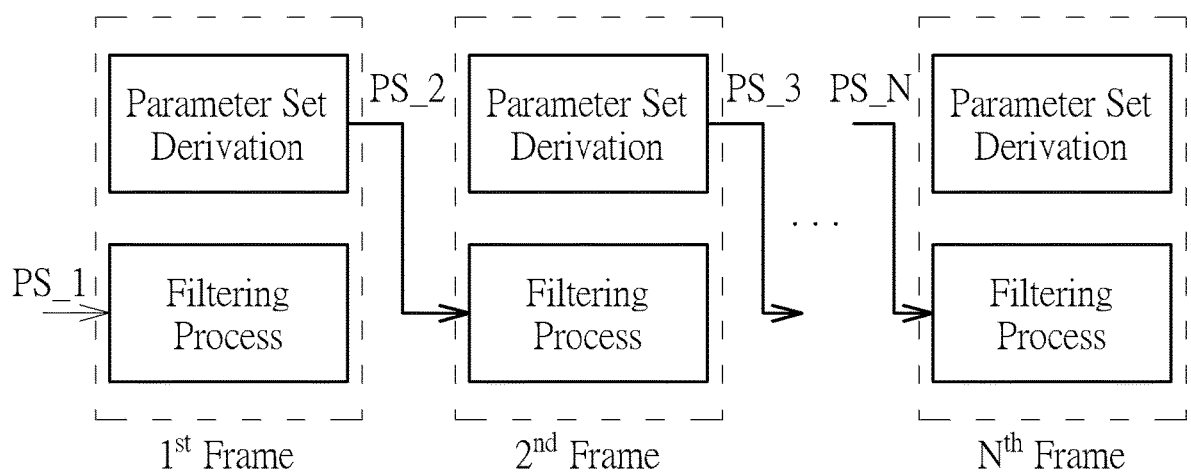
FIG. 8 is a diagram illustrating parameter set derivation used to generate at least one parameter set for one in-loop filter under low latency video encoding according to an embodiment of the present invention.

FIG. 8 is a diagram illustrating parameter set derivation used to generate at least one parameter set for one in-loop filter (e.g. ALF) under low latency video encoding according to an embodiment of the present invention. When the video encoding circuit 102 is encoding the first frame of a video sequence, an in-loop filtering process uses pre-determined filter parameter set(s) provided from the parameter set derivation circuit 125. Before the start of encoding of the second frame following the first frame, the parameter set derivation circuit 125 refers to information of the encoded frame (e.g. first encoded frame) to generate filter parameter set(s) PS_1 for later use. In other words, a new parameter set for an in-loop filtering process in the future frame is generated before encoding of the future frame is started. Hence, when the video encoding circuit 102 is encoding the second frame, an in-loop filtering process uses filter parameter set(s) PS_1 provided from the parameter set derivation circuit 125. Similarly, before the start of encoding of the third frame following the second frame, the parameter set derivation circuit 125 refers to information of encoded frame(s), such as the first encoded frame and/or the second encoded frame, to generate filter parameter set(s) PS_3 for later use. When the video encoding circuit 102 is encoding the $N^{th}$ frame, an in-loop filtering process uses filter parameter set (s) PS_N provided from the parameter set derivation circuit 125, where the filter parameter set(s) PS_N are generated before the start of encoding of the $N^{th}$ frame.

Figure 9:
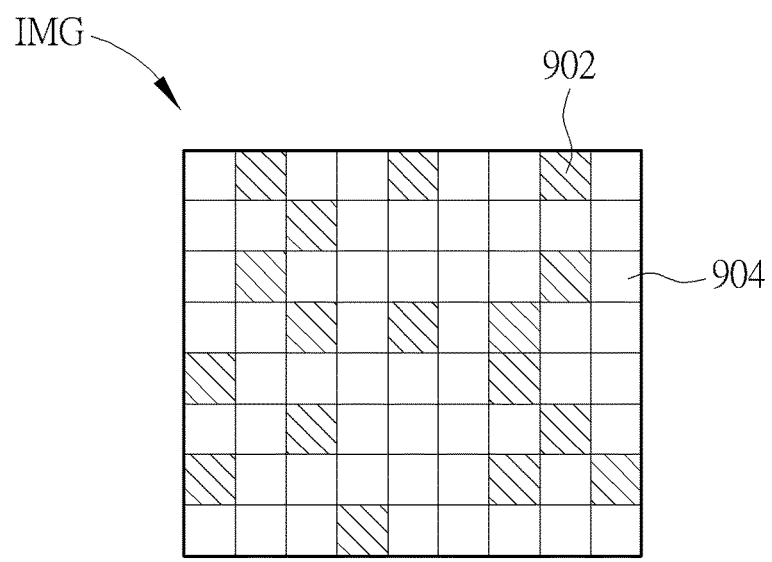
FIG. 9 is a diagram illustrating a frame having some blocks with no in-loop filtering and some blocks with in-loop filtering according to the embodiment of the present invention.

It should be noted that, as illustrated in FIG. 9, the in-loop filtering process could be disabled or enabled for each block by a rate distortion optimization (RDO) process. For example, the in-loop filtering process is disabled at each of the blocks 902 in the frame IMG, and is enabled at each of the blocks 904 in the frame IMG.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video encoding method comprising:
   during a first period, performing an encoding process upon a first block group of a current frame to generate a first block group bitstream, wherein the current frame comprises a plurality of block groups, each of the plurality of block groups comprises a plurality of blocks, each of the plurality of blocks comprises a plurality of pixels, and the plurality of block groups comprise the first block group and a second block group; and
   during a second period, transmitting a second block group bitstream derived from encoding the second block group of the current frame, wherein the second period overlaps the first period;
   wherein the encoding process comprises:
   during a first time segment of the first period, performing a first in-loop filtering process upon a first group of pixels; and
   during a second time segment of the first period, performing a second in-loop filtering process upon a second group of pixels, wherein the second time segment overlaps the first time segment, and a non-zero pixel distance exists between a first edge pixel of the first group of pixels in a filter direction and a second edge pixel of the second group of pixels in the filter direction.

2. The video encoding method of claim 1, wherein the first block group does not overlap the second block group.

3. The video encoding method of claim 1, wherein the first group of pixels do not overlap the second group of pixels.

4. The video encoding method of claim 1, wherein the first group of pixels are not processed by the second in-loop filtering process yet, and the second group of pixels are already processed by the first in-loop filtering process.

5. The video encoding method of claim 1, wherein the first edge pixel is a rightmost pixel of the first group of pixels, and the second edge pixel is a rightmost pixel of the second group of pixels.

6. The video encoding method of claim 5, wherein the non-zero pixel distance is greater than or equal to a largest number of horizontal filter taps of an in-loop filter employed by one of the first in-loop filtering process and the second in-loop filtering process.

7. The video encoding method of claim 1, wherein the first edge pixel is a bottommost pixel of the first group of pixels, and the second edge pixel is a bottommost pixel of the second group of pixels.

8. The video encoding method of claim 7, wherein the non-zero pixel distance is greater than or equal to a largest number of vertical filter taps of an in-loop filter employed by one of the first in-loop filtering process and the second in-loop filtering process.

9. The video encoding method of claim 1, further comprising:
   obtaining at least one filter parameter set of one of the first in-loop filtering process and the second in-loop filtering process, wherein said at least one filter parameter set is derived from information obtained from encoding of at least one previous frame.

10. The video encoding method of claim 1, further comprising:
    obtaining at least one pre-determined filter parameter set of one of the first in-loop filtering process and the second in-loop filtering process, wherein said at least one pre-determined filter parameter set is generated without using information obtained from encoding of at least one previous frame.

11. A video encoding apparatus comprising:
    a video encoding circuit, arranged to encode a first block group of a current frame to generate a first block group bitstream during a first period, and transmit a second block group bitstream derived from encoding a second block group of the current frame during a second period, wherein the second period overlaps the first period, the current frame comprises a plurality of block groups, each of the plurality of block groups comprises a plurality of blocks, each of the plurality of blocks comprises a plurality of pixels, and the plurality of block groups comprise the first block group and the second block group;
    wherein the video encoding circuit comprises:
    a first in-loop filter, arranged to perform a first in-loop filtering process upon a first group of pixels during a first time segment of the first period; and
    a second in-loop filter, arranged to perform a second in-loop filtering process upon a second group of pixels during a second time segment of the first period, wherein the second time segment overlaps the first time segment, and a non-zero pixel distance exists between a first edge pixel of the first group of pixels in a filter direction and a second edge pixel of the second group of pixels in the filter direction.

12. The video encoding apparatus of claim 11, wherein the first block group does not overlap the second block group.

13. The video encoding apparatus of claim 11, wherein the first group of pixels do not overlap the second group of pixels.

14. The video encoding apparatus of claim 11, wherein the first group of pixels are not processed by the second in-loop filter yet, and the second group of pixels are already processed by the first in-loop filter.

15. The video encoding apparatus of claim 11, wherein the first edge pixel is a rightmost pixel of the first group of pixels, and the second edge pixel is a rightmost pixel of the second group of pixels.

16. The video encoding apparatus of claim 15, wherein the non-zero pixel distance is greater than or equal to a largest number of horizontal filter taps of one of the first in-loop filter and the second in-loop filter.

17. The video encoding apparatus of claim 11, wherein the first edge pixel is a bottommost pixel of the first group of pixels, and the second edge pixel is a bottommost pixel of the second group of pixels.

18. The video encoding apparatus of claim 17, wherein the non-zero pixel distance is greater than or equal to a largest number of vertical filter taps of one of the first in-loop filter and the second in-loop filter.

19. The video encoding apparatus of claim 11, further comprising:
a parameter set derivation circuit, arranged to obtain at least one filter parameter set of one of the first in-loop filter and the second in-loop filter, wherein said at least one filter parameter set is derived from information obtained from encoding of at least one previous frame.

20. The video encoding apparatus of claim 11, further comprising:
a parameter set derivation circuit, arranged to obtain at least one pre-determined filter parameter set of one of the first in-loop filter and the second in-loop filter, wherein said at least one pre-determined filter parameter set is generated without using information obtained from encoding of at least one previous frame.

* * * * *